United States Patent [19]
Sigurdsson et al.

[11] Patent Number: 4,752,878
[45] Date of Patent: Jun. 21, 1988

[54] COMPUTERIZED FISHING MACHINE

[75] Inventors: Grimur Sigurdsson, Fellsasi L. Mosfellssveit; Sigurjon H. Sindrason, Seltjarnarneskaupstad; Evar Johannesson; Eggert Olafsson, Both of Reykjavik; Ragnar M. Magnusson, Gardabae, all of Iceland

[73] Assignees: Style Ltd., Gardabae, Iceland; Ocean Gear, Inc., New Bedford, Mass.

[21] Appl. No.: 820,662

[22] Filed: Jan. 21, 1986

[30] Foreign Application Priority Data

Jan. 21, 1985 [IS] Iceland ........................................ 2972

[51] Int. Cl.⁴ ...................... A01K 89/02; A01K 89/01
[52] U.S. Cl. ........................................... 364/410; 43/4
[58] Field of Search .............. 364/410; 43/4, 21, 26.1, 43/17.1, 4.5, 19.2, 17, 17.5; 242/106, 84.52, 10.06

[56] References Cited

U.S. PATENT DOCUMENTS

| | | | |
|---|---|---|---|
| 2,535,584 | 12/1950 | Lorenz | 242/84.53 |
| 3,510,084 | 5/1970 | Andrew | 242/84.52 A |
| 4,191,340 | 3/1980 | Kubanek | 242/106 |
| 4,196,871 | 4/1980 | Kobayashi | 242/84.52 |
| 4,236,340 | 12/1980 | Cunningham | 43/17 |
| 4,251,939 | 2/1981 | Tiede | 43/26.1 |
| 4,376,350 | 3/1983 | Bednarz et al. | 43/26.1 |
| 4,378,652 | 4/1983 | Lindgren | 43/26.1 |
| 4,384,427 | 5/1983 | Christiansen | 43/26.1 |
| 4,420,900 | 12/1983 | Nestor | 43/17 |
| 4,422,258 | 12/1983 | Adams | 43/17.5 |
| 4,449,317 | 5/1984 | Brodribb et al. | 43/15 |

FOREIGN PATENT DOCUMENTS

| | | |
|---|---|---|
| 0104031 | 3/1984 | European Pat. Off. . |
| 532715 | 1/1941 | United Kingdom . |
| 732821 | 6/1955 | United Kingdom . |
| 1025415 | 7/1964 | United Kingdom . |
| 1037522 | 7/1966 | United Kingdom . |
| 1100077 | 1/1968 | United Kingdom . |
| 1291764 | 10/1972 | United Kingdom . |
| 1384719 | 2/1975 | United Kingdom . |
| 0686704 | 9/1979 | U.S.S.R. ................................. 43/17 |

Primary Examiner—Jerry Smith
Assistant Examiner—Gail O. Hayes
Attorney, Agent, or Firm—Frishauf, Holtz, Goodman & Woodward

[57] ABSTRACT

A fishing machine is disclosed which automates various aspects of fishing techniques. Values for fishing depth, line pull, and jigging length can be electronically stored by the fisherman. A motor is controlled on the basis of these store values to rotate a reel on which a fishing line is stored. The reel is turned to extend the line or bring it in to implement the stored fishing depth and jigging length. The motor speed and torque are also controlled in accordance with signals obtained from a line pull detector and motor speed feedback signals. With this system, once the above-mentioned values are stored, the fishing line descends to the desired fishing depth, jigging is performed, and when the fish is hooked this is detected and it is reeled in, all this being done automatically. Further features involve a capacity to learn, store, and then simulate the particular technique of an individual fisherman.

22 Claims, 15 Drawing Sheets

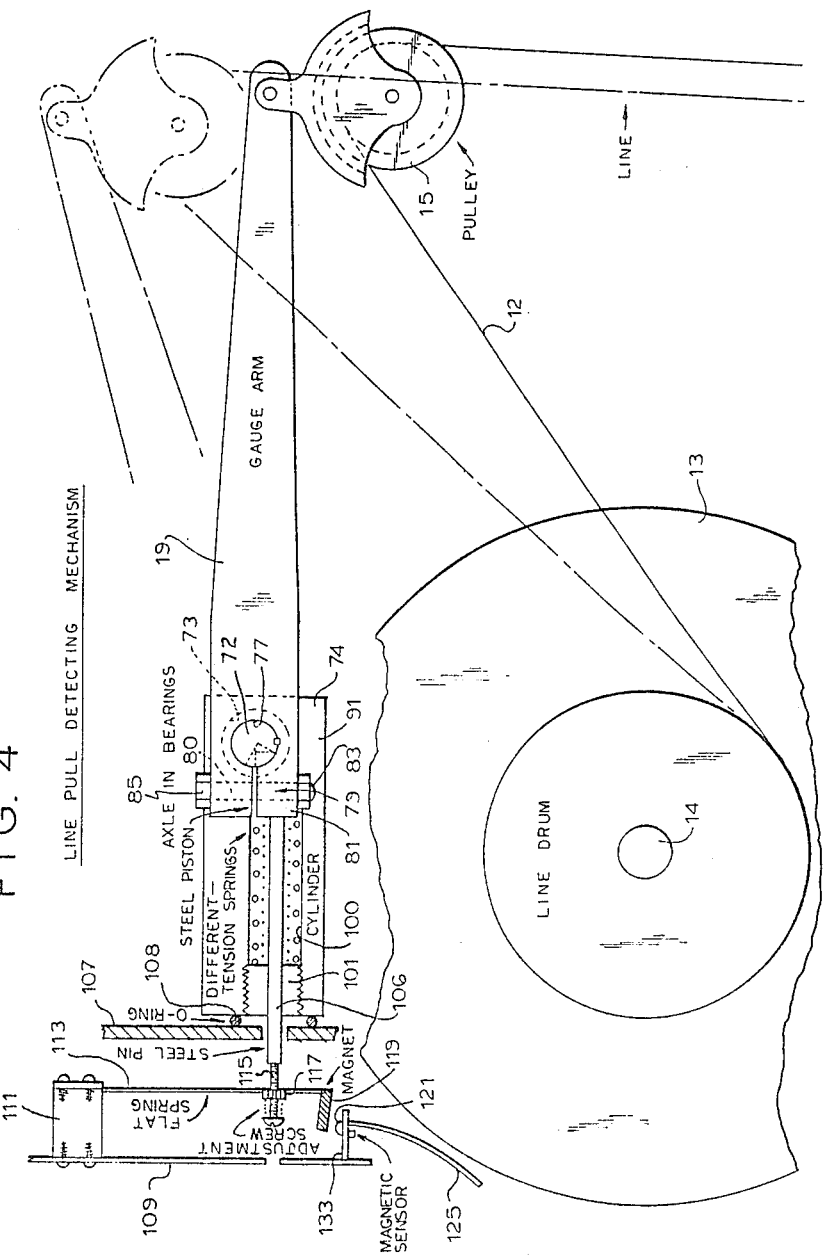

LINE DRUM BRAKE

POWER CONNECTION TO THE SYNCHRO MOTOR

COMPUTERIZED FISHING MACHINE

BACKGROUND OF THE INVENTION

This invention is related to fishing equipment and, more particularly, to a computer-controlled fishing machine.

Fish have been caught over the ages by primarily two methods. The first and most widespread is, of course, a fishing pole. It includes a fishing line wound around a reel and a long rod. A hook on the end of the fishing line serves to carry bait and, hopefully, catch the fish. This approach is particularly well suited for enjoyment and relaxation because of its highly individualistic nature. Each fisherman can readily select the location to which the hook is cast, the fishing depth, the jigging action, and the particular way in which the fish is pulled in after it is hooked. However, each fisherman can tend only to a very few number of fishing rods simultaneously. In fact, it is advisable that a fisherman tend to only the one fishing rod he holds in his hands because, otherwise, if he holds one and others are secured to the boat, should two fish be hooked simultaneously, the chance of losing the one on the untended line is significant. Therefore, even though one fisherman can ostensibly tend to more than one fishing rod, this can be frustrating and self-defeating when two or more fish are hooked simultaneously. Also, this approach cannot normally result in a large catch. The alternative approach is to use large nets cast into the water and dragged behind a boat. All the fish ensnared in the net are then pulled up on deck simultaneously. This approach can produce a large catch but the element of sport, relaxation, and enjoyment is completely missing from it. It is desirable to provide an alternative approach which can yield a higher catch than that which is possible with a single fishing rod while still retaining the enjoyment and sport missing from the ensnarement of fish with a net.

SUMMARY OF THE INVENTION

It is an object of this invention to provide an approach for catching fish that retains the sport, enjoyment, and relaxation while yielding a higher catch than that which is possible with a single fishing rod.

A further object of the invention is to provide a computer-controlled fishing machine.

Another object of the invention is to provide a computer-controlled fishing machine which can learn and then simulate the fishing characteristics of an individual.

Yet another object of the invention is to provide a computer-controlled fishing machine which is watertight, rugged, and reliable.

A further object of the invention is to provide a computer-controlled fishing machine which can sense a hooked fish and pull it in automatically.

These and other objects of the invention are attained by a system for automatically-controlled fishing comprising: a motor coupled to a drum on which is stored a length of fishing line, means for driving the motor and thereby rotating said drum to control the amount of fishing line extending from said drum, means for storing a selected fishing depth, means for determining a fishing depth value from the amount of fishing line extending from said drum, and control means for comparing the selected fishing depth and the determined fishing depth for generating a signal to the motor driving means to drive the motor until the determined fishing depth substantially equals the selected fishing depth.

Another aspect of the invention is attained by a system for automatically-controlled fishing machine comprising: a motor coupled to a drum on which is stored a length of fishing line, means for driving the motor and thereby rotating said drum to control the amount of fishing line extending from said drum, means for storing a selected line pull value, means for detecting the actual line pull on the fishing line, and control means for comparing the selected line pull and the detected line pull for generating a signal to the motor driving means to regulate power supplied to the motor so that the detected line pull is substantially equal to the selected line pull.

A further aspect of the invention is attained by a system for automatically-controlled fishing machine comprising a motor coupled to a drum on which is stored a length of fishing line, means for driving the motor and thereby rotating said drum to control the amount of fishing line extending from said drum, means for storing a selected value of jigging length, means for determining a fishing depth value from the amount of fishing line extending from said drum, means for deriving an upper fishing depth and a lower fishing depth from the selected value of jigging length and an actual fishing depth at which fishing is to be conducted, and control means for comparing the selected value of jigging length to the determined fishing depth for generating a signal to the motor driving means to cyclically drive the motor in one direction until the upper fishing depth is reached and then in the other direction until the lower fishing depth is reached.

Yet another aspect of the invention is attained by a system for automatically-controlled fishing machine comprising: a motor coupled to a drum on which is stored a length of fishing line, means for driving the motor and thereby rotating said drum to control the amount of fishing line extending from said drum, means for determining a fishing depth value from the amount of fishing line extending from said drum, means coupled to said depth determining means for monitoring a manually controlled fishing depth, means coupled to said depth, means coupled to said depth determining means for monitoring a manually controlled jigging length, means for storing the monitored fishing depth and jigging length, and automatic control means for, when actuated, generating a signal to said motor driving means to automatically attain an actual fishing depth and an actual jigging length, respectively, corresponding to the stored fishing depth and the stored jigging length.

Still another aspect of the invention is attained by a load detecting mechanism comprising: a support, a gauge arm rotatably coupled to said support, means for rotating said gauge arm in response to applied load, and means responsive to the position of said gauge arm for generating a load signal related to the magnitude of the applied load.

Yet still a further aspect of the invention is attained by a method for automatically controlling a fishing machine having a motor driving a line drum with fishing line wound thereon, said method comprising the steps of: storing a desired value of fishing depth, detecting the actual depth of the fishing line, comparing the desired fishing depth and the detected fishing depth, and controlling the motor to move the fishing line in accordance with such comparison so that the desired fishing depth is attained and maintained.

BRIEF DESCRIPTION OF THE DRAWINGS

FIG. 4 is an elevational view of the line-pull detecting mechanism;

DETAILED DESCRIPTION OF A PREFERRED EMBODIMENT OF THE INVENTION

Figure 1:
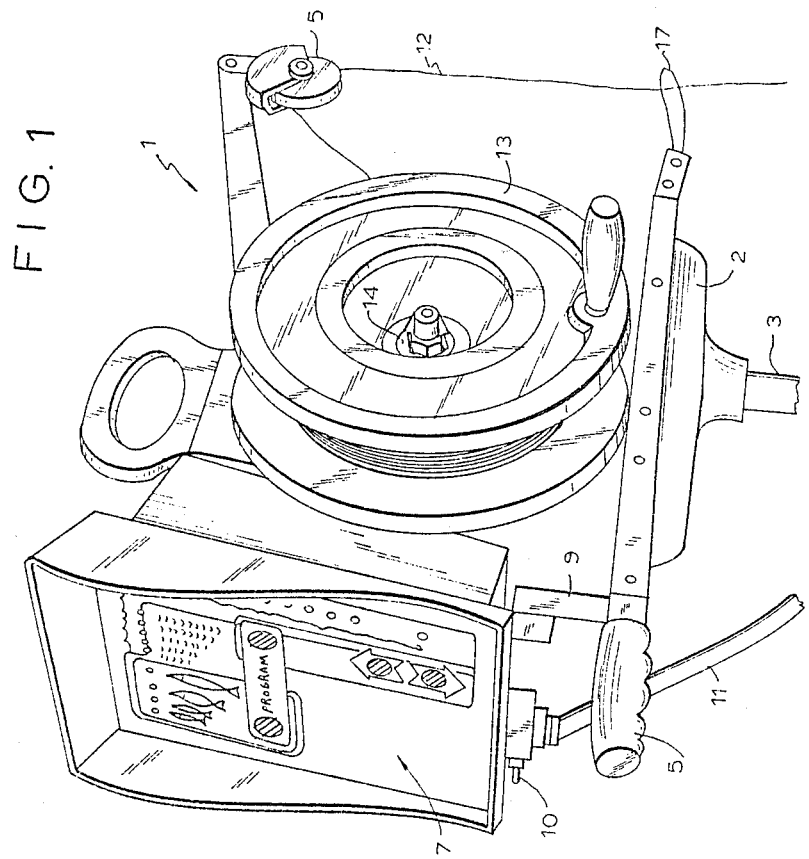
FIG. 1 is a perspective view of the control panel, line drum, and pulley of the invention.

Fishing machine 1 as depicted in FIG. 1 includes a base 2 mounted on pole 3. Pole 3 is attached to the boat gunwale (not shown). Pole 3 can be, for example, the widely used hollow tube into which hand-operated fishing reels are inserted when not held by the fisherman. Pole 3 fits into an opening in base 2 so that fishing machine 1 sits securely in place. However, rotation of base 2 relative to and around the axis of pole 3 is possible so that the entire fishing machine 1 can be swivelled in any desired direction. Brake arm 17 is mounted on base 2 in a manner described below in greater detail with regard to FIGS. 6a and 6b. Control panel 7 is attached to base 2 by way of bracket 9. The details of control panel 7 are provided below in connection with the description of FIG. 2. Switch 10 mounted to the bottom of control panel 7 is used to supply power from cable 11 to the circuits of control panel 7 and the other electrical and electronic elements of this invention described below. The source of power (not shown) to which cable 11 is connected can be the DC power supply of the boat or a special power source. Fishing line 12 is wound around line drum 13 rotatable on shaft 14. Shaft 14 is connected by conventional means (not shown) to the base 2. Line drum 13 is rotated along with shaft 14 which is driven by a motor the details of which are provided below in connection with the discussion of FIG. 7. This motor is also mounted to base 2 by conventional means (not shown).

Fishing line 12 extends from drum 13 over pulley 15 and down toward the water (not shown) through loop 17 on handle 5. Pulley 15 dangles from gauge arm 19 secured to base 2 via a line-pull detecting mechanism not shown in FIG. 1 but to be discussed below with reference to FIG. 4.

Figure 2:
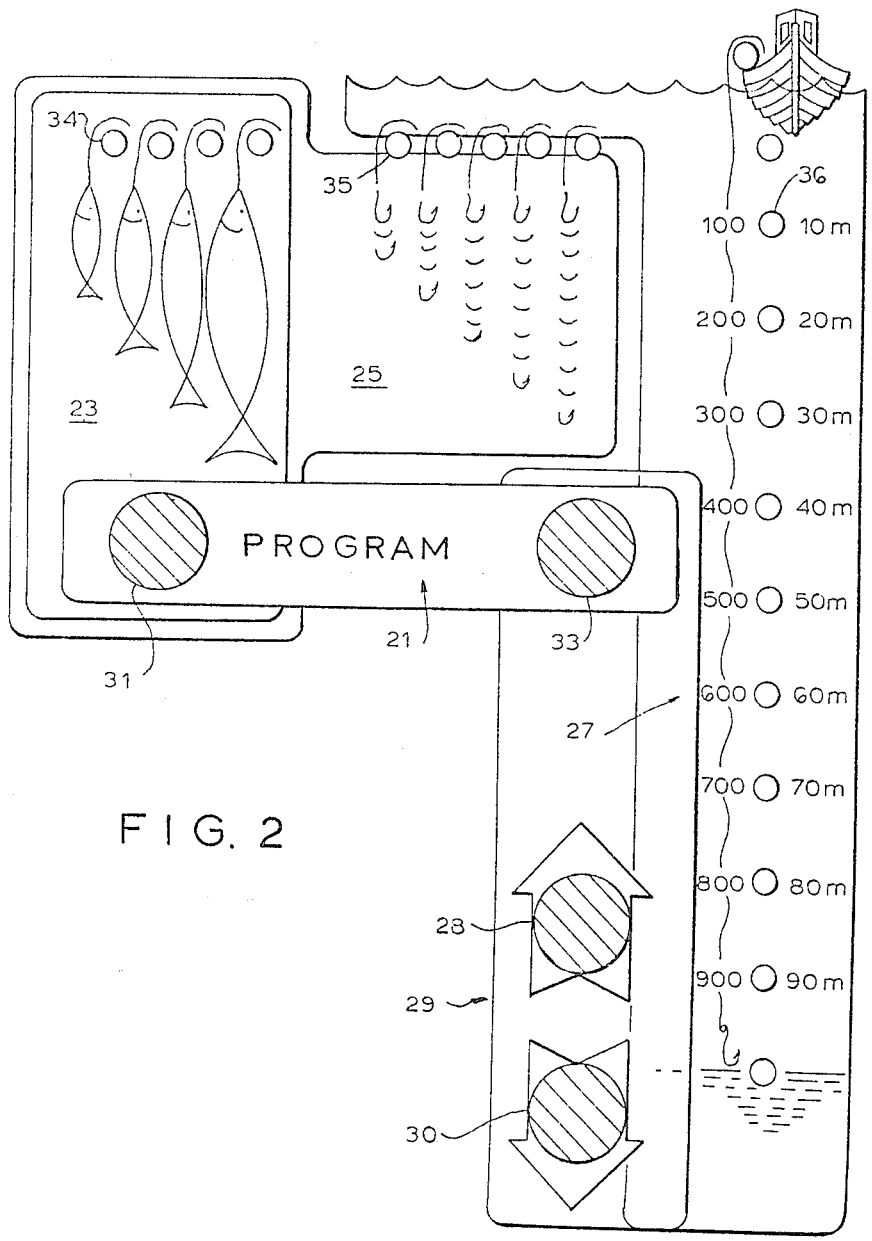
FIG. 2 is a plan view of the panel.

The front of control panel 7 is shown in detail in FIG. 2. It includes five main parts. Programming section 21 is utilized to set the fishing machine into a programming mode as well as to input the desired information to set the automated, programmed fishing characteristics of fishing machine 1. Line pull section 23 indicates during the programming mode a particular line pull value available at any given time for selection by the fisherman with programming section 21. When the programming is set, line pull section 23 indicates which value has been selected. Jigging length section 25 provides during the programming mode an indication of a particular value of jigging length available at a given time for selection by the fisherman. After programming is set, jigging length section 25 indicates which value has been selected. Fishing depth section 27 provides during the programming mode an indication of the depth to which the fishing line is to descend. It also provides an indication when the fishing line has hit bottom. Finally, up-/down control 29 provides direct and immediate control of the line depth without going through any programming routines.

Programming section 21 includes buttons 31 and 33. Both must be pushed simultaneously in order to place the fishing machine 1 into its programming mode. When this is done, line pull section 23 is put into action. It includes four lights with a caricature of a differently sized fish below each, respectively. The larger the depicted fish, the larger is the set value of line pull. The four lights 34 will blink on and off in sequence from left to right, i.e. from the minimum value of line pull to the maximum. When a particular light 34 blinks on, the value corresponding to that particular line pull is at that exact time available for input as the stored line pull. If button 31 is pushed, then that particular value will be selected and the light corresponding to it will remain lit. All the other lights 34 remain off.

After a particular line pull is selected, jigging length section 25 is automatically actuated. Its five lights 35 will blink on and off sequentially. Each light corresponds to a particular value of distance through which the fishing line will be jerked up and down. This is known as jigging. The jigging depth increases from its minimum to its maximum as the blinking lights 35 progress from the leftmost position to the rightmost. To select a desired jigging length, button 31 is pressed at the instant when light 35 above the desired jigging length is lit. As a result, that light 35 remains lit and all the other lights 35 remain off.

Fishing depth section 27 includes eleven vertically spaced lights 36. The top light represents the home position with the line 12 having been brought up. The bottom light 36 is lit when the fishing line hits bottom. The intermediate nine lights have a two-digit value, in increments of ten, from ten meters to ninety meters or a three-digit value, in increments of 100, from 100 to 900. Initially, these lights 36 assume a two-digit value. However, if a depth up to ninety meters is not selected, then the sequence will return to the top. The lights will continue to blink on and off sequentially but with a three-digit value from 100 to 900 meters. When a three-digit value is selected, then the sequential blinking of lights 36 again assumes a two-digit value. Thus, if the fisherman wishes to fish, for example, at a depth of 120 meters, he will refrain from pressing button 33 on the first sequencing cycle of lights 36. On the second cycle, he will press button 33 when the light 36 indicative of 100 meters blinks This will set the depth at 100 meters plus another two-digit depth yet to be set. After the button 33 is pressed for the first time, blinking of the lights begins sequencing again. When the light 36 indicative of 20 meters blinks, button 33 is pressed to set that depth. The total of the two settings is 100 plus 20 which equals a depth of 120 meters.

The control panel 7 is available to the fisherman to store various fishing characteristics to desired values in order to obtain the type of fishing he prefers. However, if no programming buttons are pressed after power switch 10 is turned on, the fishing machine automatically defaults to preprogrammed medium values for line pull, jigging length and jigging depth, and then begins jigging from the bottom. This provides several advantages. Firstly, commercial fishermen using several fishing machines simultaneously on board their vessels will want to start fishing without spending any time for adjustment. Secondly, most fishermen like to start fishing from the bottom and later to move to other depths. The details of how this default mode is carried out will be provided in the explanation presented below.

Completing the features available on control panel 7 is up/down control 29. It includes an up button 28 and a down button 30. By using these buttons, the fisherman can change the fishing depth without the need to make any other adjustments in the programmed values. In other words, the instructions input by up/down control 29 override the programmed value in fishing depth section 27. Buttons 28 and 30 can also be used for jigging by cyclically pressing one and then the other. The fishing line can be raised at any desired time by the fisherman simply by continually pressing the up button 28 until the hooks are fully raised to their home position. Movement of the fishing line 12 under control of buttons 28 and 30 can be stopped at any depth by pressing button 33.

Figure 3:
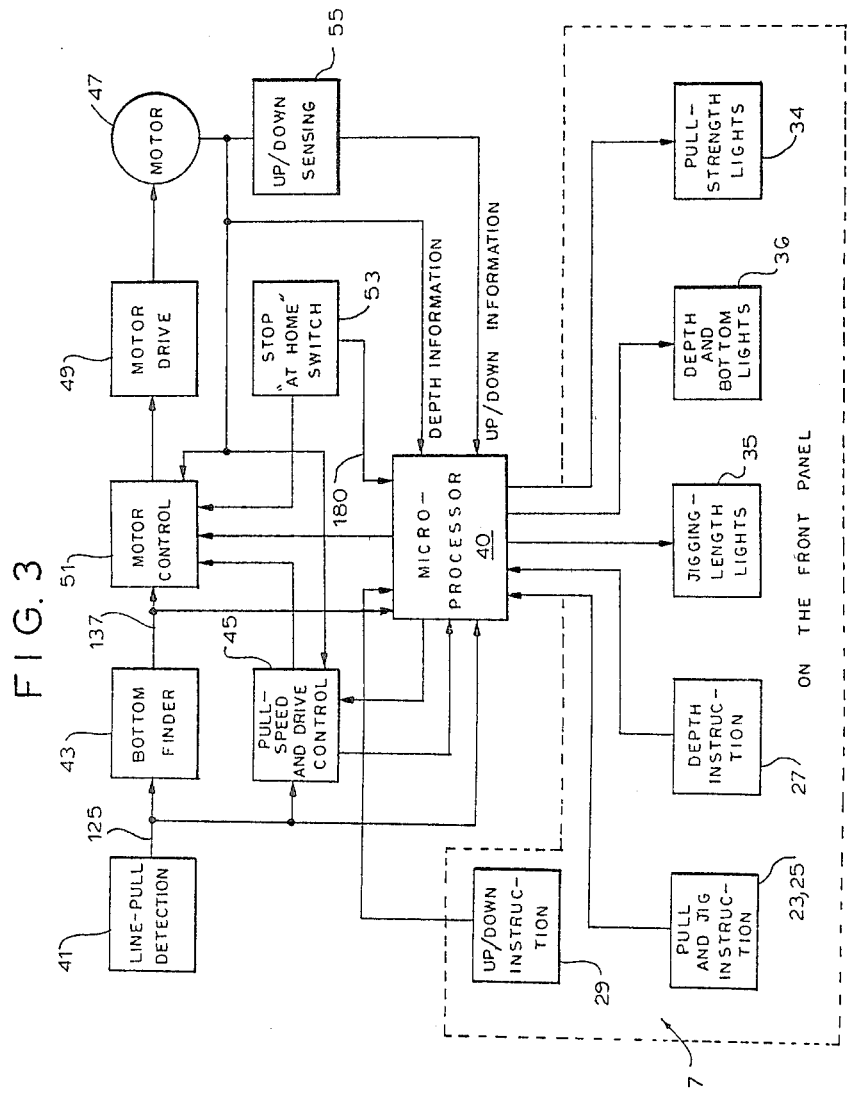
FIG. 3 is a schematic block diagram of the circuit of the invention.

A schematic block diagram of the circuitry is depicted in FIG. 3. Control panel 7 is outlined in broken lines and includes the elements discussed just above in connection with FIG. 2. Specifically, control panel 7 is shown as having a pull and jig instruction unit corresponding to sections 23 and 25 in FIG. 2, a depth instruction section 27, jigging length lights 35, depth and bottom lights 36, pull strength lights 34, and up/down instruction section 29. At the heart of this circuitry is a suitably programmed microprocessor 40. Its program details are presented below. It is preferably a CDP 1805 microprocessor available from RCA with an internal RAM of 64K bytes, an internal timer, and 16 general purpose registers. Associated with this microprocessor are a 27C32 external PROM and a 62C32 external RAM each having a storage capacity of 4K bytes. Also associated with the microprocessor are two CDP 1851 PIO devices available from RCA, with each having 20 programmable inputs/outputs.

Figure 5A:
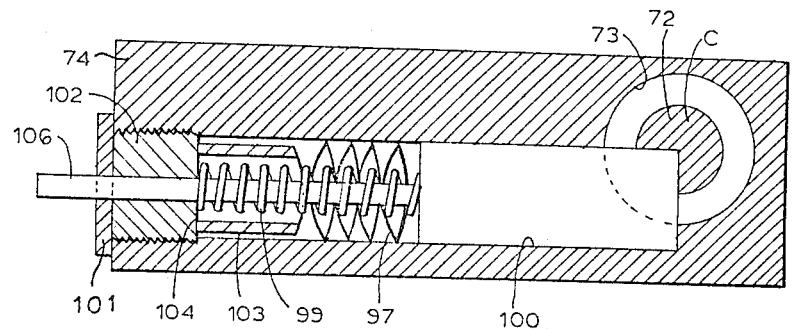
FIGS. 5a–c show a cross-sectional view of the line-pull-gauge cylinder with each showing a different position of the axle and piston, and FIGS. 5b, c being shown without the springs.
Figure 5B:
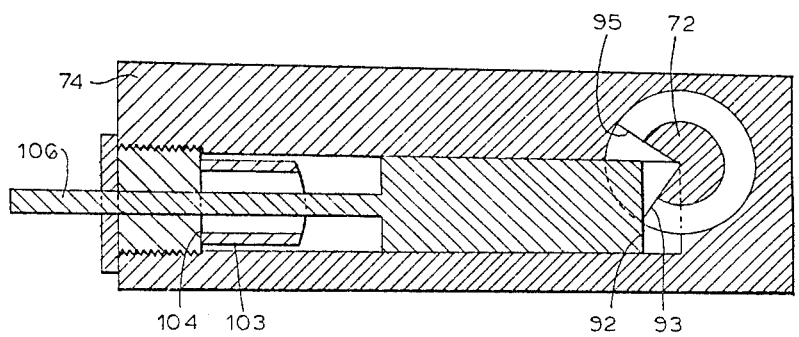
Figure 5C:
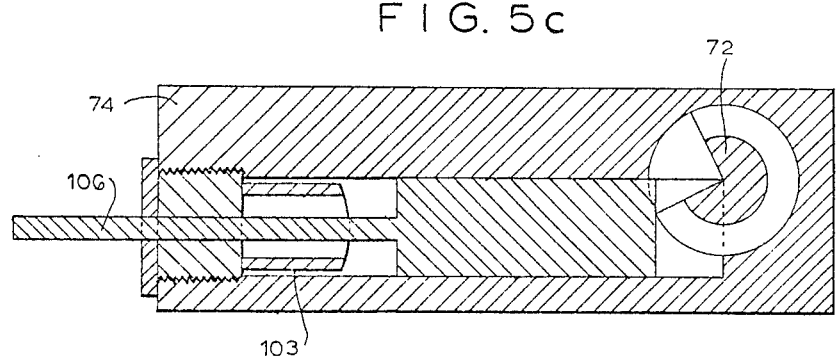

Line pull detection mechanism 41, which is discussed below in detail with regard to FIGS. 4 and 5, provides an output signal to bottom finder circuit 43 (see FIG. 10), pull speed and drive control circuits 45 (see FIG. 10), and microprocessor 40. Motor 47 (see FIG. 7) receives power from motor drive circuit 49 (see FIG. 7). The motor drive circuit is operated by motor control circuit 51 (see FIG. 8). Several inputs are provided to motor control circuit 51. These inputs to motor control circuit 51 are generated by bottom finder circuit 43, pull-speed and drive control circuit 45, microprocessor 40, and motor 47 which provides a motor position signal. In addition, a stop "at home" switch 53 (see FIG. 10) indicates to motor control circuit 51 that the fishing line 12 has been fully retracted and is now stored on line drum 13. The motor position signal is also input to pull-speed and drive control circuit 45. The motor signal is also fed directly to microprocessor 40 and to up/down sensing circuit 55 (see FIG. 9) which, in turn, provides a signal to microprocessor 40. Microprocessor 40 receives additional signals from bottom finder 43, stop "at home" switch 53 up/down control section 29, and the pull-speed and drive control circuit 45. In addition to providing an output to motor control circuit 51, microprocessor 40 also generates an input signal for pull-speed and drive control circuit 45, jigging length lights 35, depth and bottom lights 36, and pull strength lights 34.

With the above-described circuit configuration, control panel 7 serves to input instructions to microprocessor 40 and display the stored instructions. Once microprocessor 40 has been suitably programmed by the fisherman, or operating under control of the default values preprogrammed into microprocessor 40, the remaining circuits serve to control motor 47 by monitoring the fishing line depth, the amount of line pull sensed on it, the actual operation of the motor, and reacting to fulfill the fishing parameters which have been programmed into microprocessor 40.

Figure 7:
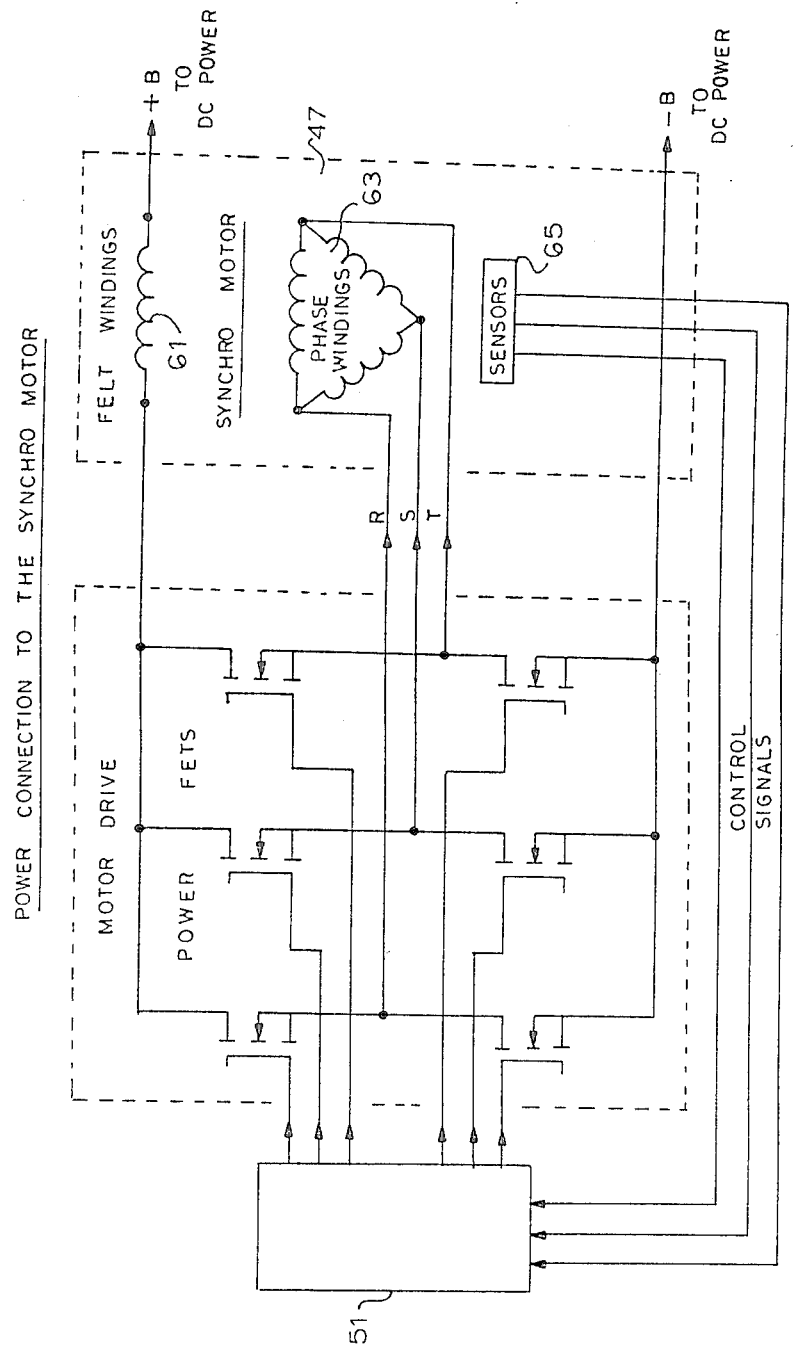
FIG. 7 shows the circuits which supply power to the motor.
Figure 8:
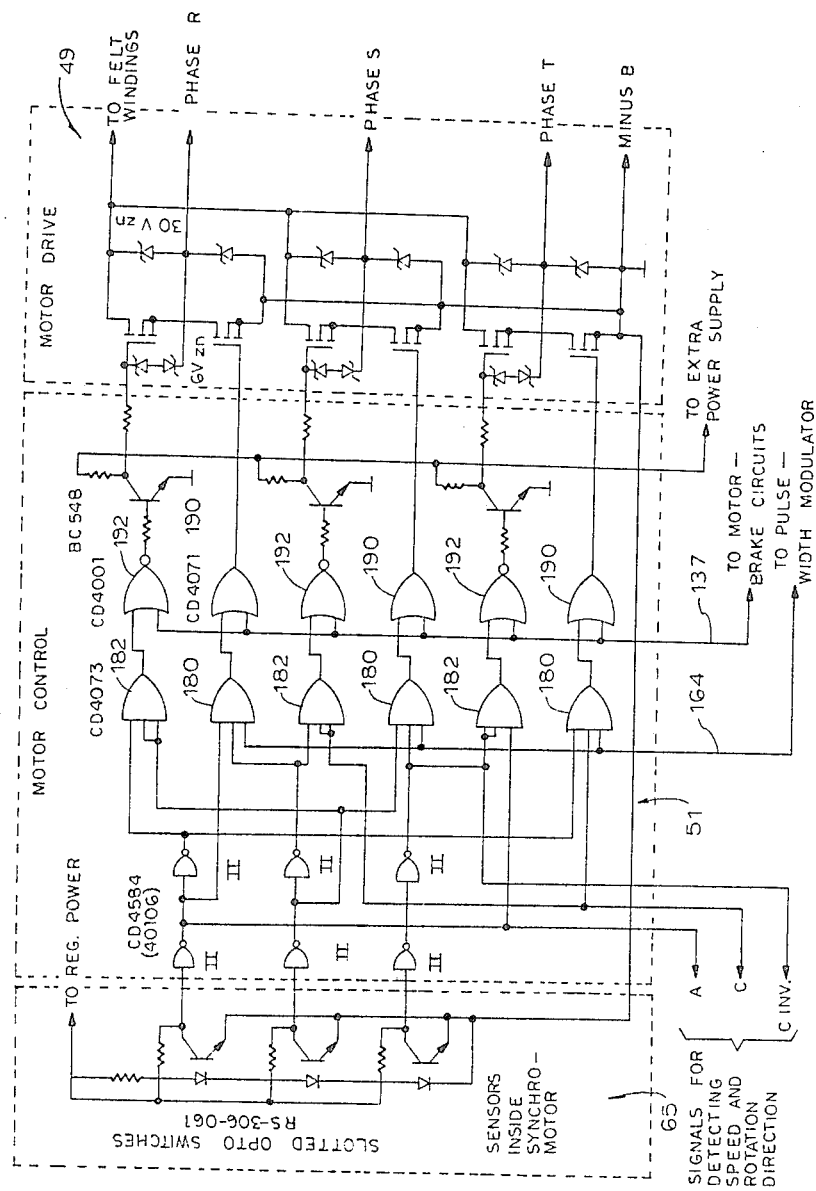
FIG. 8 shows the circuits which sense motor position and control the supply of power to the motor.

Turning first to FIGS. 7 and 8, motor 47 is a synchronous motor of a conventional type including felt windings 61, phase windings 63, and sensors 65. Sensors 65 detect the precise motor position, and can be any one of several well known devices capable of performing this task. The preferred sensors are slotted opto-switches model No. RS-306-061 shown in FIG. 8. As shown in FIG. 3, the signal from sensors 65 is fed to motor control circuit 51 which treats it as a synchronizing signal for controlling the supply of power to motor 47. Up/down sensing circuit 55 utilizes the signal from sensors 65 to determine the direction of motor rotation. Also, the output of sensors 65 is converted in pull-speed and drive control circuit 45 to a feedback signal indicative of the motor speed which circuit 45 then utilizes to regulate the motor speed. Finally, the output of sensors 65 is input directly to microprocessor 40 which determines therefrom the depth of fishing line 12 based on the number of rotations of motor 47 which is directly related to the number of rotations made by line drum 13.

With regard to line-pull detecting mechanism 41, FIG. 4 shows gauge arm 19 from which pulley 15 dangles. Fishing line 12 is wrapped around the upper portion of pulley 15 and is supplied from line drum 13 rotating on axle 14. Axle 72 is freely rotatable within opening 73 in cylinder 74. Cylinder 74 is firmly attached to base 2 of the fishing machine 1 so that it is stably held in position with respect to the boat gunwale by conventional means (not shown). Bearings (not shown), facilitate the free rotation of axle 72 in opening 73. Axle 72 is also rotatably supported by other conventional means (not shown) secured to base 2. These serve to bear the brunt of the forces imparted to gauge arm 19, which can be substantial when a fish is being pulled in. The end of gauge arm 19 opposite from that which supports pulley 15 includes an opening 77 and a bifurcated section 79. The bifurcated section 79 includes arms 80 and 81 usable for varying the diameter of opening 77. Opening 77 normally is sized to slidably accommodate within it axle 72. Once axle 72 is inserted into opening 77 of gauge arm 19, a screw 83 is inserted through aligned openings in arms 80 and 81 and nut 85 is tightened to secure gauge 19 to axle 72. With this arrangement, axle 72 extends through both openings 73 in cylinder 74 and opening 77 in gauge arm 19 to thereby rotatably attach gauge arm 19 to cylinder 74.

Axle 72 has approximately one-quarter of its cross section removed. Thus, as best shown in FIG. 5, it can accommodate within it the end of a piston 91 which fits into axle 72 so that front wall 92 of piston 91 abuts against wall 93 of axle 72. Likewise, top wall 94 of piston 91 abuts against wall 95 of axle 72. The removed portion of axle 72 can extend for its entire length or only for the portion engaged by piston 91.

Piston 91 is resiliently biased toward axle 72. Thus, the position of piston 91 is controlled by rotation of axle 72. Piston 91 assumes its most extended position in FIG. 5a when axle 72 is in the position shown therein. As axle 72 is rotated clockwise to the position depicted in FIG. 5b, wall 93 will bear against wall 92 to thereby force piston 91 towards the left as viewed in FIG. 5. Further clockwise rotation of axle 72 results in further displacing piston 91 to the left.

Gauge arm 19 is normally kept in the upwardly slanting position shown in dotted lines in FIG. 4. It is maintained in this position by piston 91 under the biassing force imparted to piston 91 by springs 97 and 99 positioned within cylinder 74. As piston 91 is urged by these springs toward axle 72, the piston urges axle 72 to rotate counterclockwise until the position of gauge arm 19 shown in dotted lines in FIG. 4 is reached. A load on fishing line 12 creates a downward force on pulley 15. As a result, gauge arm 19 will be forced downward against the bias of the springs. The degree to which gauge arm 19 is moved downward depends on the force exerted by the load versus the force exerted by the springs, as explained in further detail below.

Piston 74 includes a long, tube-like opening 100 which accommodates piston 91, springs 97 and 99, and cap 101. As best shown in FIG. 5, cap 101 is threaded and securely fits into the capped portion of opening 100. Integral nut portion 102 of cap 101 is used to secure it to, and remove cap 101 from, opening 100. Cap 101 also has a cylindrical portion 103 extending therefrom into opening 100. The diameter of cylindrical portion 103 is less than the diameter of spring 97 but greater than the diameter of spring 99. Thus, spring 99 is accommodated within it and abuts against side wall 104 of cap 101. Spring 97 abuts against the edge of cylindrical portion 103.

Cap 101 also includes an opening 105 through which passes shaft 106 of piston 91. Shaft 106 can be manufactured integrally with piston 91 or can be attached by conventional means to it. Shaft 106 passes through both springs 97 and 99. It is long enough to extend outside of cylinder 74 even when piston 91 is in its most extended (rightmost) position.

Spring 99 is formed from a steel coil spring which is 12 mm in diameter and extends from wall 104 of cap 101 into abutment with piston 91. Spring 97 is formed of a number of steel spring discs each of which is 20 mm in diameter Alteratively, a suitable heavy pressure steel spring may be used as well. It fits between cylindrical portion 103 and piston 91. With this arrangement, two different spring constants can be brought to bear during motion of piston 91 due to load forces applied to fishing line 12. Initially, spring 99 with a relatively lower spring constant will be operative to urge gauge arm 19 upward against the applied load forces. As heavier loads are encountered and piston 91 moves leftward beyond a certain point due to gauge arm 19 being forced downward by the load, spring 99 with a higher spring constant takes over. A load of only a few hundred grams is needed to move piston 91 from its position in FIG. 5a to that shown in FIG. 5b. Thus, relatively small changes in a very light load can be detected, as explained below, to generate significant changes in the signal output from this mechanism. However, when the load becomes heavier, significantly greater load changes are required to obtain changes of a similar magnitude in the output signal from this mechanism because the resistance to movement of piston 91 is greater. A load of 30 kg is needed to move piston 91 to the position shown in FIG. 5c. This feature is very important for detecting the relatively small load changes encountered as the fishing line reaches the bottom. However, it also provides the ability to respond to relatively greater load changes encountered as a fish is being reeled in. Thus, it is highly sensitive to small load changes when such sensitivity is required while still being able to respond in a more gross manner when sensitivity to small load changes is no longer required.

Continuing with a description of the line pull detecting mechanism, FIG. 4 shows cylinder 74 secured next to a housing of which only one wall 107 is shown. An O-ring 108 provides a waterproof seal between these two parts so that no water can seep into housing 107. Housing 107 includes a plate 109 to which a block 111 is attached, as by screws. A flat spring 113 is secured to and extends from block 111. Spring 113 is made of a non-magnetic resilient material such as non-magnetic stainless steel or brass. It is biased toward plate 109. flat spring 113 has at its free end an opening through which a screw 115 is passed. Screw 115 is threaded into the free end of shaft 106. A nut 117 is also attached onto screw 115. The extreme portion of the free end of flat spring 113 carries a permanent magnet 119. In proximity to permanent magnet 119 is a magnetic sensor 121 carried on a support 123 attached to plate 109. Magnetic sensor 125 can be a Hall effect detector model RS-304-267-(634552). A wire 125 provides the electrical output from magnetic sensor 121. The signal output from magnetic sensor 125 depends on the position relative thereto of magnet 119. Thus, the output from magnetic sensor 121 will vary as magnet 119 moves in position relative thereto. The nut 117 is turned relative to screw 115 so that flat spring 113 is positioned so as to place magnet 119 relative to magnetic sensor 121 such that a certain calibrated output signal from the magnetic sensor is obtained on line 125 when piston 91 is in its most extended position. As axle 72 rotates with gauge arm 19 under load forces encountered by fishing line 12, as explained above, piston 91 will be retracted (moved to the left) into opening 100 by a distance corresponding to the difference between the load force and the spring force exerted by springs 97 and 99. As piston 91 is retracted, nut 117 is no longer positioned where it keeps flat spring 113 in the originally set spot. As a result, the resilient spring will bend to move magnet 119 toward plate 109 and closer to magnetic sensor 121, thereby resulting in a larger magnitude output signal corresponding to the higher encountered load. Similarly, as load forces are reduced, springs 97 and 99 urge piston 91 into a more extended position, thereby resulting in nut 117 forcing flat spring 113 to move against this bias away from plate 109 and thereby vary the position of magnet 119 relative to magnetic sensor 121 to reduce its output signal.

Figure 10:
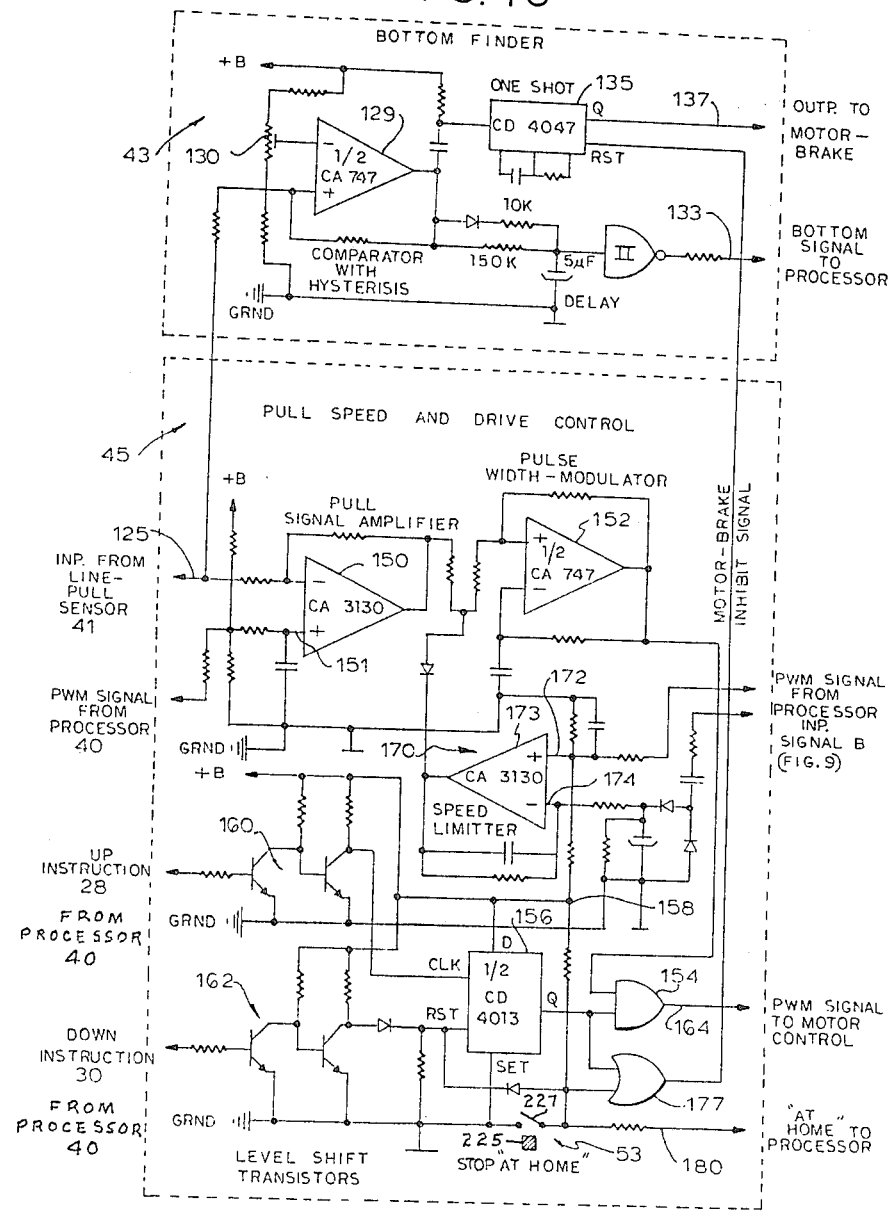
FIG. 10 is a schematic circuit diagram of a bottom finder circuit and the pull-speed and drive-control circuit.

The signal on line 125 is input to bottom finder circuit 43 shown in detail in FIG. 10. An operational amplifier 129 acting as a voltage comparator is suitably biased by potentiometer 130 in conjunction with, standard resistive, capacitive and other associated elements to provide a threshold value for the operational amplifier 129. It is preferably a Model No. CA747. As fishing line 12 descends to the bottom, it exerts a certain load on gauge arm 17. Consequently, a positive voltage of a magnitude depending on the load is present at the output of amplifier 129 while the fishing line is descending. This positive voltage acts to charge the 5 uF capacitor 134 at the input to NOR gate 136 through diode 130 and resistor 132. This time delay circuit insures that the microprocessor does not receive a bottom signal due to only a momentary release of the line tension caused by sea waves or other false "bottom sensing", but only receives a signal when the line reaches the real bottom. When the fishing line hits bottom, the decrease in load is immediately sensed because, as explained above, spring 99 with a lower spring coefficient is operative against movement on the load of gauge arm 19 to rotate it counterclockwise. This decrease in sensed load below the threshold value to which operational amplifier 129 has been set acts to trigger one shot 135 to brake the motor. Also, capacitor 134 discharges through resistor 138. When capacitor 134 discharges below the trigger level of NOR gate 136, it provides an output signal to microprocessor 40 along line 133. Braking of the motor insures that the fishing line will not become entangled due to continued motor operation after the fishing line has hit bottom.

FIG. 10 provides the circuit details of the pull speed and drive control circuit 45. It includes a pull signal amplifier 150 to which the output from line pull detector mechanism 41 is input on line 125. A pulse width modulated signal from processor 40 is also input to amplifier 150 over an RC network. The difference between the two signals is amplified and input to pulse width modulator 152. It provides a signal with the pulse width varying in dependence on the output of amplifier 150. The output of modulator 152 is provided to AND gate 154. The other input of AND gate 154 is connected to the Q output of flip-flop 156. This Q output is normally high so that AND gate 154 passes the pulse width modulated signals 152 to motor control circuit 51 on line 164.

In operation, the pulse width modulated signal from processor 40 generates a reference signal at input 151 of amplifier 150 which corresponds to the line pull programmed into the processor. The pulses are integrated by the RC network at input 151 to provide a relatively stable reference signal. The magnitude of the input signal on line 25 from line pull detector 41 is subtracted from this reference signal. Thus, the higher the load, the lower is the output signal from amplifier 150. In response, modulator 152 will output pulses of a suitable width to motor control circuit 51 via AND gate 154 to vary the torque and speed of the motor to the programmed values. If after a fish is hooked the line pull drops, the motor will automatically reel in the fish. If the line pull increases beyond the selected value, power to the motor is reduced so that the fish can draw out the line. Each time the fish yields, the machine pulls it in. On the other hand, the machine yields when the fish is strong to tire fish and to prevent the fishing line 12 from possibly snapping.

The signal from processor 40 is also input to a speed limiter circuit 170. It establishes a reference value at input 172 of a comparator 173 with the assistance of an RC network. A position signal B (see FIG. 8) from one of the motor sensors is provided to input 174 of comparator 173. As motor speed increases, the difference between the signals at input 172 and 174 of comparator 173 sets a limiting value on the signal which can be provided to pulse width modulator 152 by amplifier 150. Therefore, an upper limit on motor speed is established to a safe level.

Pull speed and drive control circuit 45 is also responsive to the stop "at home" switch 53, means the structure of which is discussed below. Switch means 53 is open when the fishing line 12 is fully reacted (i.e. "at home") from the water. This is due to magnet 225 causing switch 227 to open (see below with regard to FIGS. 6a and 6b). When switch means 53 is open, a high signal from the voltage provided at mode 158 is transmitted to monostable multivibrator 135 via NOR gate 177. This resets the one shot and, in turn, inhibits a motor brake signal on line 137. The reel is kept from turning in the "at home" position by mechanical brake pad 220 (see FIG. 6b). At the same time, a signal is sent on line 180 to microprocessor 140 indicating that the fishing line 12 is fully retracted. An up instruction from button 28 is input to level shift transisters 160 while a down instruction from button 30 is input to level shift transistors 162. These operate in a conventional fashion to shift the value of the pulse width modulated signal input to motor control circuit 51 on line 164 so as to control the rotational direction of the motor. The Q output of flip-flop 156 is high when its clock input receives an UP signal. As a result, AND gate 154 will pass motor control sigals from modulator 152 to drive the motor. When the reset input of flip-flop 156 receives a DOWN signal, its Q output will be low thereby inhibiting the supply of motor control signals through AND gate 154. The motor will be free to turn in a free-running condition to allow the line to descend under the load pull of the line. The low Q output also resets one-shot 135 via NOR gate 135 to inhibit motor braking until the bottom is detected. In this manner, the motor is freely rotated to pay out fishing line 12 or rotated under power to retract as desired by the fisherman.

As shown in FIG. 8, the signal on line 164 is input to AND gates 180 in motor control circuit 51. Output signals from sensors 65 are input, respectively, to each of AND gates 180. Thus, the sensors synchronize the supply of control signals to the motor drive circuit 49 based on the position of the motor. AND gates 182 are connected to various combinations of the sensors 65 in a well known manner. Motor control circuit 51 is generally well known and, therefore, it is deemed that no further details regarding sensors 65 and AND gates 180, 182 is required. The outputs from AND gates 180 are passed to motor drive circuit 49 through OR gates 190. The outputs from AND gates 182 are passed to motor drive circuit 49 via NOR gates 192. The outputs from NOR gates 190 and 192 are input via power transistors to the phase windings of motor 47. This is also conventional and, thus, no further details are deemed necessary.

The output signal on line 137 (see also FIG. 10) is input to each of OR gates 190 and NOR gates 192. Thus, when this brake control signal signal goes high, it is passed by the respective OR and NOR gates to motor drive circuit 49 so that all the phase windings are energized simultaneously. This applies an immediate braking action to the motor in a well known manner.

Figure 9:
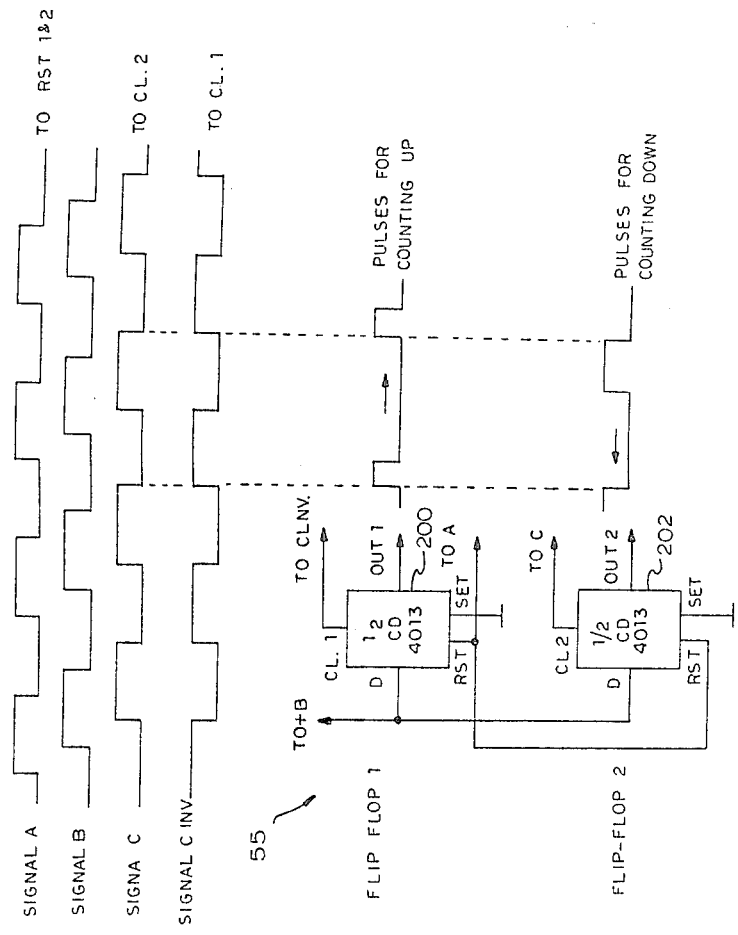
FIG. 9 is a block diagram with associated timing signals for the up/down sensing circuit.

FIG. 9 shows details of the up/down sensing circuits 55. This circuit utilizes signals A, C, and Cinv which are provided in a manner as shown in FIG. 8 from sensors 65. Circuits 55 includes flip-flops 200 and 202. The D input of both flip-flops is connected to a positive voltage supply. The reset input of both flip-flops is connected to signal A. The set input of both flip-flops is grounded. The clock input of flip-flop 200 is connected to the Cinv signal while the clock input of the flip-flop 202 is connected to the C signal. As a result, when motor 47 is turning in the "forward" direction (i.e. when fishing line 12 is paid out), flip-flop 200 produces at its output one pulse for each positive going pulse edge on signal Cinv. However, no pulse is produced at the output of flip-flop 200 when the motor is rotating in the reverse direction. Likewise, when motor 47 turns in the reverse direction, flip-flop 202 produces at its output one pulse for each positive going edge on signal C while it produces no output signal when the motor is turning in the forward direction.

Figure 6A:
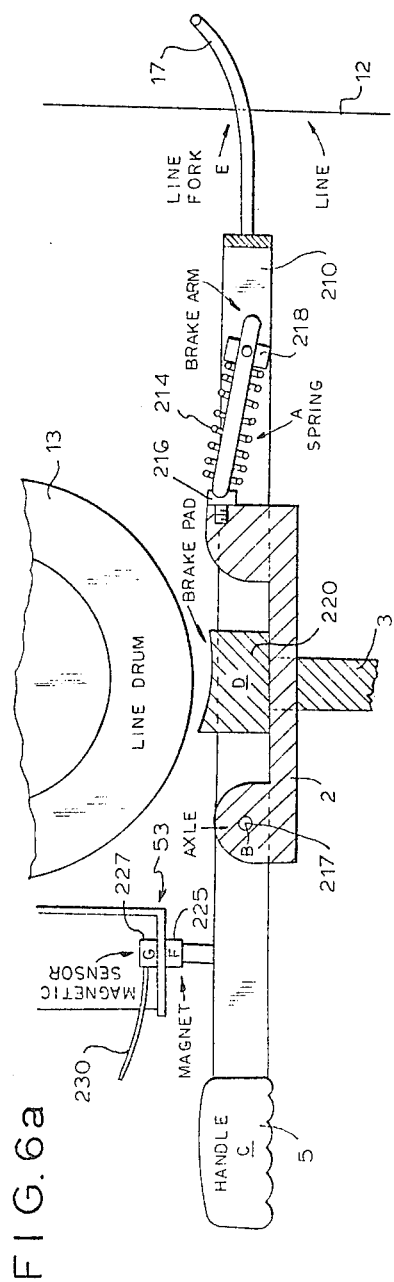
FIGS. 6a and 6b show an elevational view of a view of the brake arm in its two stable positions.
Figure 6B:
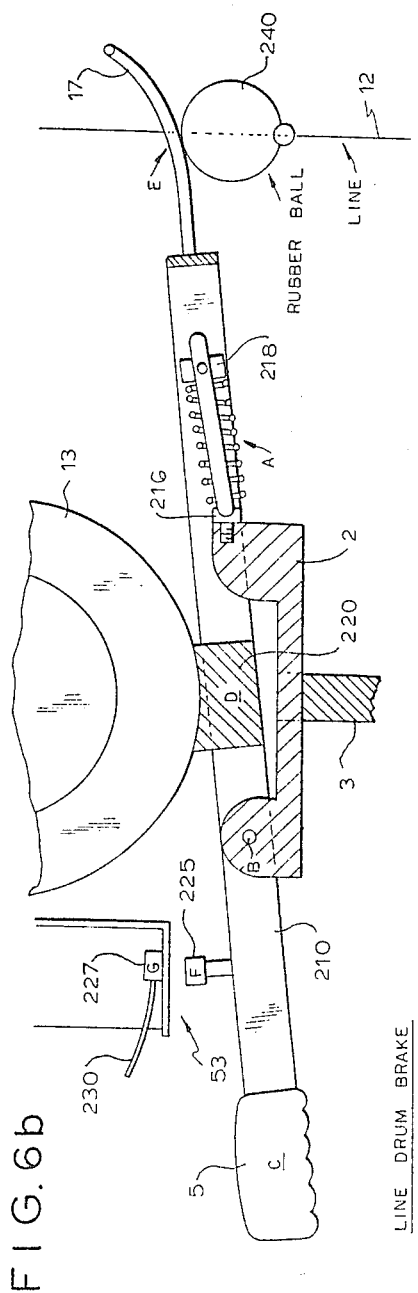

Operation of the mechanical brake and the stop "at home" sensor are explained in connection with FIGS. 6a and 6b. Movable brake arm 210 is rotatably coupled to base 2 by shaft 212. Spring 214 is coupled between arm 210 and the base 2 to provide it with two stable positions. One position is shown in FIG. 6a with brake arm 210 lying horizontally and resting on base 2. Spring 214 is in compression between brackets 216 on base 2 and brackets 218 on arm 210. Therefore, it urges arm 210 into this position whenever bracket 218 is level with or below bracket 216. With bracket 218 above bracket 216, spring 214 will urge arm 210 into the position depicted on FIG. 6b.

A brake pad 220 is attached to brake arm 210 below line drum 13. With brake arm 210 in its lower position, as shown in FIG. 6a, a space exists between brake arm 220 and line drum 13 so that the line drum can rotate freely. However, when brake arm 210 is in its other stable position as shown in FIG. 6b, brake pad 220 forcefully bears against line drum 13 to create a braking action. At the opposed ends of brake arm 210 are attached a handle 5 and loop 17. Near handle 5 is attached a permanent magnet 225 which cooperates with a magnetic sensor siwtch 227 attached by conventional means (not shown) to the fishing machine. Movement of brake arm 210 controls the position of the magnet 225 relative to sensor swtich 227. A wire 230 provides an output signal from magnetic sensor 227. The signal is dependent on whether magnet 225 is adjacent to or removed from the sensor.

Fishing line 12 carries a ball 240 having a diameter larger than the opening of loop 17. Ball 240, which can be made of a rubber or plastic material, for example, is attached to fishing line 12 just above the fishing hook. If more than one hook is attached to line 12, then ball 240 is attached to line 12 just above the highest hook. As line 12 is retracted to be wound around line drum 13, ball 240 will jar loop 17 and force it upward as line 12 continues to be drawn into line drum 13. As a result, the force on loop 17 from ball 240 will flip brake arm 210 from its horizontal stable position to its inclined stable position. Consequently, brake pad 220 will produce a braking action on line drum 13 to bring it to a stop. At the same time, magnetic sensor 227 will sense the movement away from it of magnet 225 and will output a resultant signal on line 230. In this state, the fishing line is in its "at home" position and magnetic sensor 227 generates an "at home" signal. The release of the brake from line drum 13 is achieved manually by grasping handle 5 and bringing arm 210 into its horizontal, stable position.

Figure 11:
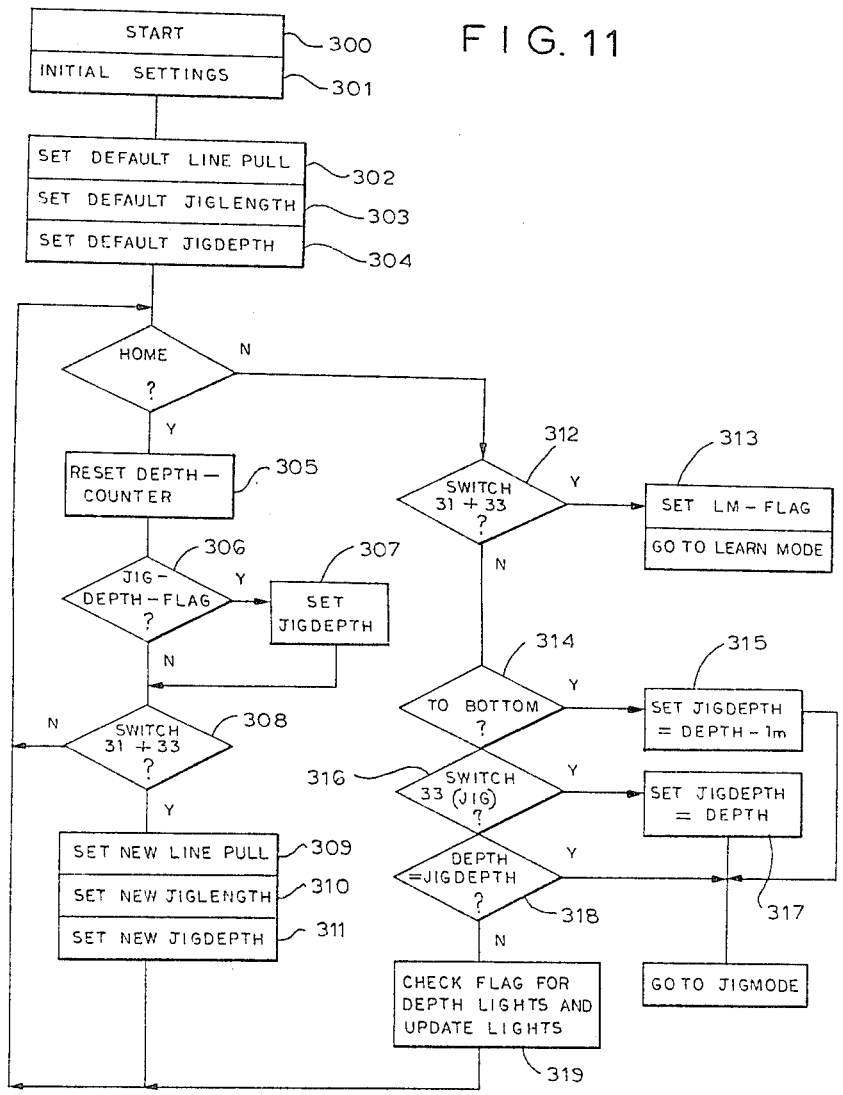
FIG. 11 is a flow chart of the home-up/down operation.

FIGS. 11-15 are flow charts which explain the way in which microprocessor 40 has been programmed to operate. Turning first to FIG. 11, steps 300 and 301 are used to initialize the microprocessor. In steps 302, 303, and 304, the pre-programmed default values are retrieved for line pull, jig length, and jig depth, respectively. If the line is detected as being "at home", the depth counter is reset to a value of zero in step 305. In decision box 306 it is determined whether the jig depth flag has been set. The flag is set by the jigging mode routine explained below with reference to FIG. 12. If the jig depth flag is set, then the jig depth is stored in step 307. If the jig depth flag has not been set, then decision box 308 determines whether switches 31 and 33 have been pressed. As indicated above, if these two switches are pressed simultaneously, new fishing parameters can be programmed into microprocessor 40 by the fisherman. Thus, as indicated in FIG. 11, if the switches have been depressed, then the values of line pull, jig length, and jig depth are set, respectively, by steps 309, 310 and 311. This is accomplished with the sequentially blinking lights explained above with regard to FIG. 2. If switches 31 and 33 have not been pressed simultaneously, then the routine moves from decision box 38 back to a determination of whether the fishing line is in its "at home" position.

If it is determined that the fishing line is not at its "at home" position (i.e., the fishing line has been paid out), then decision box 312 determines whether switches 31 and 33 have been pressed simultaneously. If they have been, then the LM flag is set in step 313 and the routine proceeds to the learn mode explained in detail below in connection with the description of FIG. 13. If the switches have not been depressed simultaneously, then it is determined in decision box 314 whether the bottom has been reached. If it has been, then the jig depth is set in step 315 as the actual depth of the line as it hits bottom minus the desired jigging length. Then, the routine proceeds to the jigging mode operation which is described in detail below in connection with FIG. 12. If it is determined in decision box 314 that the bottom has not been reached, decision box 316 checks whether switch 33 has been pressed by the fisherman. If it has been, then the jig depth selected by the fisherman is stored in step 317. If switch 33 has not been depressed, then decision box 318 determines whether the depth equals the default jig depth established by step 304. If it does not, then step 319 determines whether lights 34, 35 and/or 36 need to be updated based on any selections made during the current cycle of steps by the fisherman. If the depth is determined by decision box 318 to equal the default jig depth, then the routine exits to the jigging mode operation explained below in connection with FIG. 12.

Figure 12:
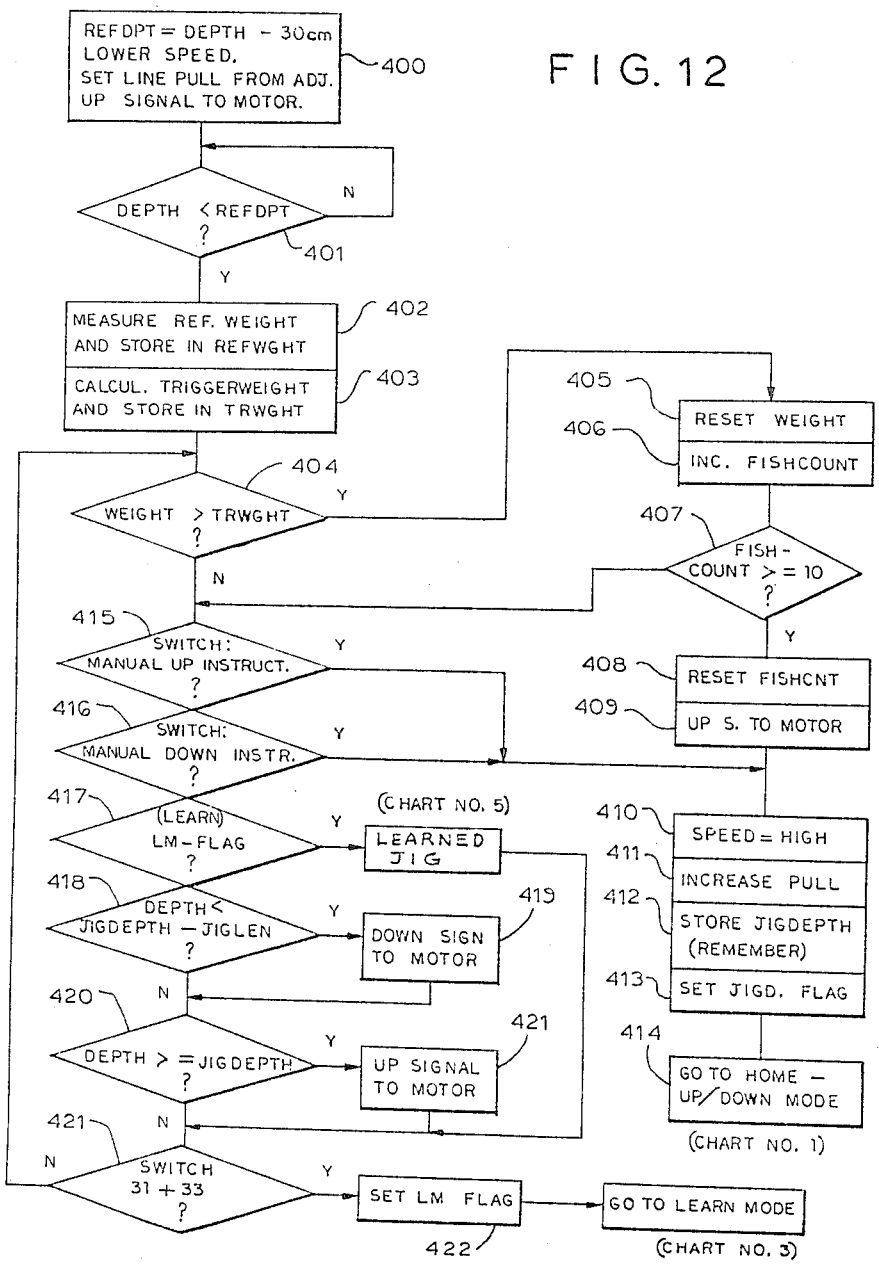
FIG. 12 is a flow chart for the jigging operation.

FIG. 12 explains how the jigging mode routine is performed by microprocessor 40. Specifically, in step 400 a reference depth, REFDEPT is set to equal the selected jigging depth minus 30 cm. Also, a value for a lower rate of speed is set, as is a value of line pull and an up signal to motor 47. Decision box 401 determines whether the actual depth is less than the reference depth. If it is not, then the routine is cycled back to the input of decision box 401. If it is, then in step 402 a reference weight value, REFWGHT, is stored. This weight depends on various factors including the updated length of fishing line 12 at each depth. In step 403 a value for the trigger weight, TRWGHT, is calculated. This trigger weight is incrementally higher than the reference weight and provides the system with a sensitivity to a fish being hooked. Thus, the incremental value of the trigger weight above the reference weight must take into account the fact that the detected value will be affected by waves and the rolling motion of the boat since these vary the load detected by gauge arm 19. Accordingly, the trigger weight must be set higher than the expected effects of such load changes. Preferably, the trigger weight is ten times higher than the reference weight. If decision box 404 determines that the detected weight is higher than the trigger weight, then steps 405 and 406 together with decision box 407 determine whether the detected weight is more than ten times higher than the trigger weight. If it is, that means that a fish has been hooked. Consequently, steps 408 and 409 result in sending a signal to the motor for reeling in the fishing line in order to pull in the fish. Step 410 sets a high motor speed, step 411 increases the line pull, step 412 stores the jig depth at which the fish is hooked, and step 413 sets a jig depth flag previously discussed in connection with decision box 36 of FIG. 11. As a result, the next time that a fishing line descends into the water, it will be lowered to that jig depth at which the fish was hooked. Following step 413, in step 414 the routine exits to the routine described above with regard to FIG. 11.

If the detected weight is not greater than the trigger weight, or if the detected weight is less than ten times the trigger weight, decision box 415 determines whether up button 28 has been pressed. If it has not been, then decision box 416 determines whether switch 30 has been pressed. If either switch 28 or 30 has been pressed, the routine proceeds to steps 410-414 described above. If neither switch has been pressed, then decision box 417 determines whether the learn flag, LM, has been set. This has previously been discussed with regard to box 312 and step 313 of FIG. 11. If the LM flag has been set, then the routine exits to the Learned Jig routine described in connection with FIG. 14 below.

If the LM flag has not been set, then box 418 determines whether the actual depth is less than the set jig depth minus the jig length. If it is, then step 419 continues the descent of the fishing line by giving the motor a down signal. If this condition is not met, then box 420 determines whether the actual depth is greater than the jig depth. If it is, then the fishing line is brought up to the set jig depth by virtue of an up signal sent to motor 47 in step 421. If this condition is not met, then the routine proceeds to decision box 421 which determines whether switches 31 and 33 have been pressed simultaneously. If they have not been, then the routine returns to decision box 404. If buttons 31 and 33 have been pressed simultaneously, then the LM flag is set in step 422 just as it was in step 313 of FIG. 11. Subsequently, this routine exits to the learn mode explained in connection with FIG. 13.

Figure 13:
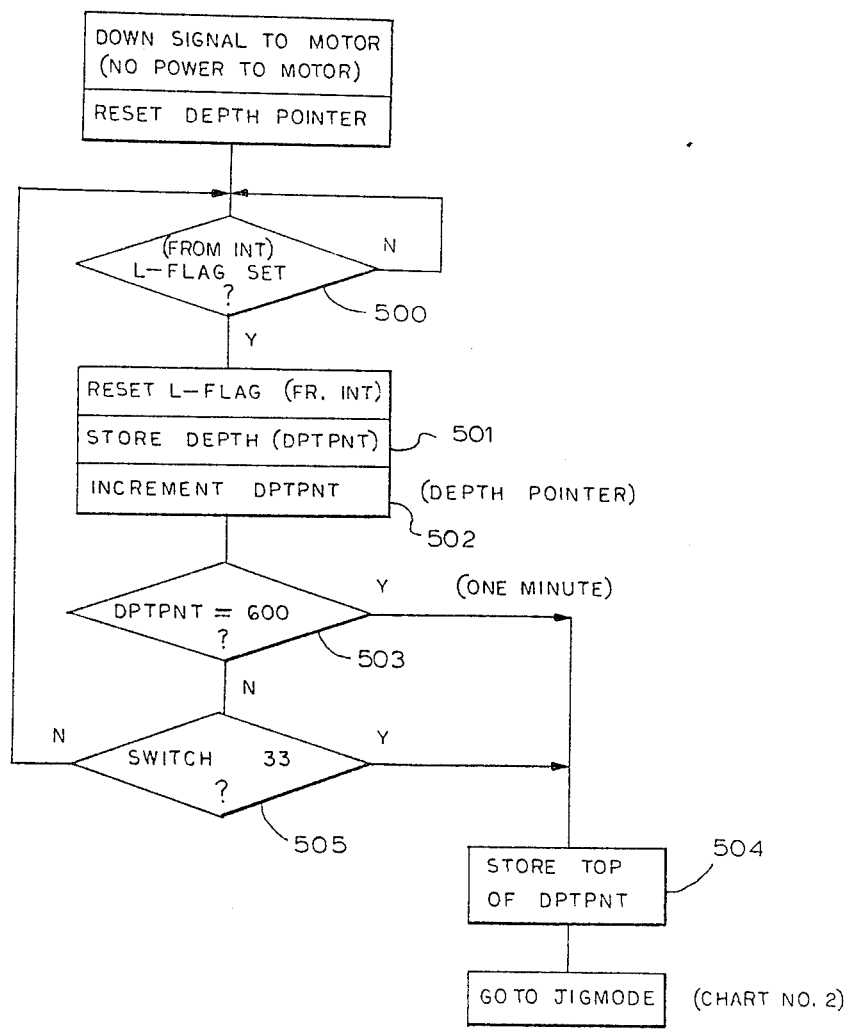
FIG. 13 is a flow chart of the learn operation.

As shown in FIG. 13, once the learn mode routine has been entered, it is operational for storing the depth at which the fisherman has chosen to fish by manual control. He selects the up and down motions of the fishing line without control of any programmed value in microprocessor 40. Microprocessor 40 monitors and stores what is done by the fisherman with the learn mode routine. The depth selected by the fisherman is monitored and stored in one minute intervals. The actual depth is monitored ten times per second, or 600 times during each one-minute interval. Thus, decision box 500 determines whether the L flag has been set by the interrupt routine shown in FIG. 15. This provides timing control to the learn mode routine. The depth is stored in each cycle by step 501 at an assigned address identified by the depth pointer (dptpnt). Step 502 increments the depth pointer to the next address, and then decision box 503 determines whether 600 depth measurements have been stored which is equivalent to whether one minute has passed from the first monitored actual depth which has been stored. If a minute has passed, then step 504 stores the last monitored actual depth measurement in the buffer devoted for this function and the program exits to the jigging mode explained above in connection with FIG. 12. If a minute has not passed, then box 505 monitors whether button 33 has been pressed in the interim by the fisherman. If it has not been, then the program continues to cycle by returning to box 500. If switch 33 has been pressed, then the current depth value at that time is stored in step 504.

Figure 14:
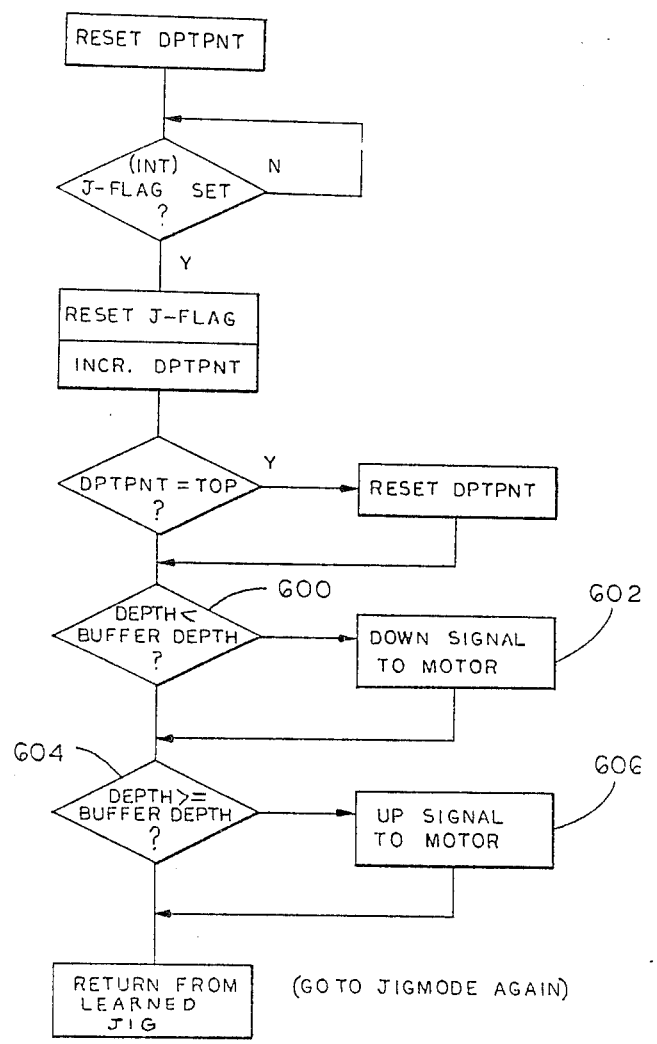
FIG. 14 is a flow chart of the jiglearn routine.

FIG. 14 describes the Learned Jig routine which simulates the jigging habits of the fisherman. This routine is part if the jigging mode routine explained above with regard to FIG. 12. It is actuated by the fisherman when he wants his own jig which has been previously stored by the LEARN routine (explained above in connection with FIG. 13) to be automatically simulated by the fishing machine. Each fisherman can have his own personal touch and feel for how to catch fish effected simultaneously at many fishing stations without his having to personally handle a fishing pole.

Figure 15:
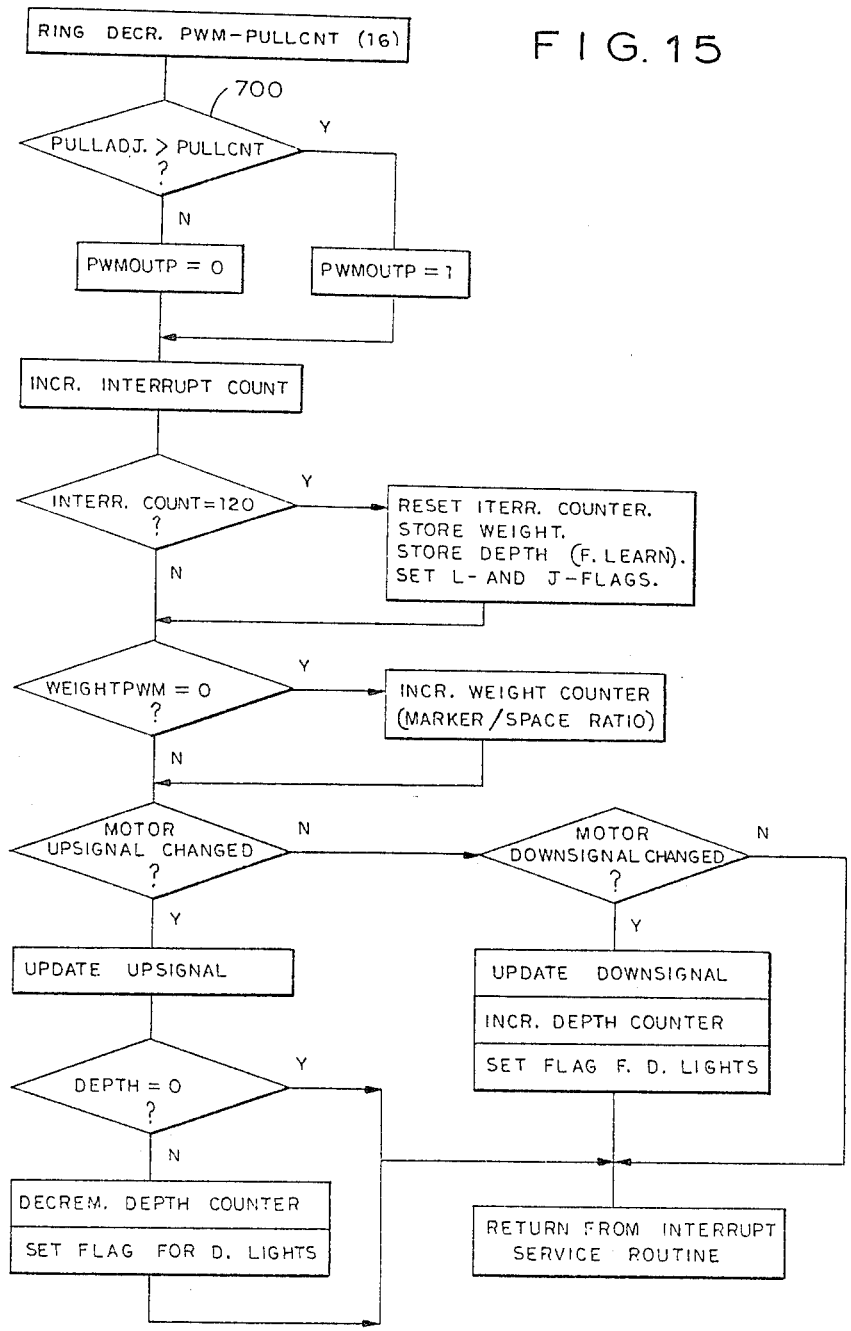
FIG. 15 is a flow chart of the interrupt routine.

When this mode is selected by the fisherman, the interrupt routine sets a J flag in a manner shown by FIG. 15. As a result, the Learned Jig looks to the assigned buffers in which the jig length has been stored in the above-mentioned 600 address locations. Thus, decision box 600 determines whether the actual depth of the fishing line is less than the stored buffer depth. If it is, then the line is lowered by suitably commanding the motor in step 602. If this condition is not met, then decision box 604 determines whether the actual depth is greater than the buffer depth. If it is then an up signal is generated to the motor in step 606. This is done for each of the depths stored in the 600 addresses as determined by the depth pointer signal. In this manner, the line will be jerked up and down for the jig length previously used by the fisherman. When this routine is completed, it exits to the jigging mode explained above in connection with FIG. 12.

The interrupt routine can be explained in connection with the flow chart shown in FIG. 15. Its function is to interrupt the microprocessor 1200 times per second by an internal interrupt timer. The interrupt service routine controls three independent functions, namely: (1) the power to the motor by a pulse width modulated signal at 75 Hz, (2) the measurements of load on fishing line 12 by pulse width modulated signal from the line pull detecting mechanism with the load being measured ten time per second, and (3) the depth is determined from signals supplied to the microprocessor by the motor at a rate of 12 per motor rotation. The various steps and decision boxes are believed to be self-explanatory and, thereofore, no further details are deemed necessary.

With the arrangement described above, a fishing machine is provided which is automated to the extent that practically the only thing that the fisherman has to do is to bring the hooked fish onboard, unhook it, and release the mechanical brake to let the line run back out again. One man can, therefore, operate several such machines simultaneously to increase his catch yet still apply his personal fishing technique. Although a preferred embodiment has been disclosed above, various changes to it should be readily apparent. All such changes are intended to be a part of the invention as defined by the following claims.

We claim:

1. A system for automatically-controlled fishing machine comprising:
   a motor coupled to a drum on which is stored a length of fishing line;
   means for driving the motor and thereby rotating said drum to control the amount of fishing line extending from said drum;
   means for storing a selected fishing depth comprising a first electronic memory into which a default depth value has been stored;
   control means for comparing the selected fishing depth and the determined fishing depth for generating a signal to the motor driving means to drive the motor until the determined fishing depth substantially equals the selected fishing depth.

2. The system of claim 1, wherein the means for storing a selected fishing depth comprises a second electronic memory coupled to a selecting means for setting a desired value.

3. The system of claim 2, further comprising up-/down electrical control means for providing a signal to the motor drive means which overrides the signal from said control means.

4. The system of claim 1, further comprising bottom finder means for detecting when the fishing line has reached bottom and, in response, to generate a brake signal to said motor driving means for stopping the motor.

5. The system of claim 4, wherein said bottom finder means comprises load detecting means for sensing the load on the line, reference means to establish a reference load signal, and comparator means coupled to the load detecting means and the reference means to generate said brake signal when the sensed load signal drops below the level of said reference load signal.

6. The system of claim 1, further comprising an arm having attached thereto a brake pad and a biasing means for providing said arm with two stable positions, a support carrying said line drum and said arm in proximity to each other, said brake pad being spaced from the line drum when the arm is in one of said two stable positions and said brake pad forcefully bearing against said line drum when the arm is in the other of its two stable positions, and means on said fishing arm which forcefully engage said arm when the fishing line is reeled in so that it is stored to the maximum extent desirable on said line drum to flip the arm from its said one position to its said other position.

7. A system for automatically-controlled fishing machine comprising:
   a motor coupled to a drum on which is stored a length of fishing line;
   means for driving the motor and thereby rotating said drum to control the amount of fishing line extending from said drum;
   means for storing a selected line pull value:
   means for detecting the actual line pull on the fishing line; and
   control means for comparing the selected line pull and the detected line pull for generating a signal to the motor driving means to regulate power supplied to the motor so that the detected line pull is substantially equal to the selected line pull.

8. The system of claim 7, wherein the means for detecting the actual line pull on the fishing line comprises a support, a gauge arm rotatably coupled to said support to move closer to and away from a water line, said fishing line being coupled to said gauge arm, means for sensing the position of said gauge arm to provide a load signal related to the load applied to the gauge arm by said fishing line.

9. The system of claim 8, wherein the gauge arm position sensing means comprises means to convert rotation of the gauge arm to linear movement, and a transducer responsive to such linear movement to generate said load signal.

10. The system of claim 9, wherein the means to convert rotation of the gauge arm to linear movement comprises an axle connected to and rotatable with said gauge arm, said axle having a flat wall formed in its circular periphery, a cylinder mounted on said support, a piston slidably received within an opening in said cylinder, resilient biasing means urging said piston into contact with said flat wall, said transducer having a stationary portion secured to said support and a movable portion coupled to said piston.

11. The system of claim 10, wherein said resilient biasing means comprises two spring means having different spring constants with the one having the lower spring constant being effective during initial movement of the gauge arm from a position assumed when the load on the fishing line is light and the other being effective when the load on the fishing line is heavier.

12. The system of claim 7, wherein the means for storing a selected line pull comprises a first electronic memory into which a default line pull value has been stored.

13. The system of claim 12, wherein the means for storing a selected line pull comprises a second electronic memory coupled to selecting means for setting a desired value.

14. The system of claim 13, further comprising up-/down electrical control means for providing a signal to the motor drive means which overrides the signal from said control means.

15. a system for automatically-controlled fishing machine comprising:
   a motor coupled to a drum on which is stored a length of fishing line;
   means for driving the motor and thereby rotating said drum to control the amount of fishing line extending from said drum;
   means for storing a selected value of jigging length;
   means for determining a fishing depth value from the amount of fishing line extending from said drum:
   means for deriving an upper fishing depth and a lower fishing depth from the selected value of jigging length and an actual fishing depth at which fishing is to be conducted; and
   control means for comparing the selected value of jigging length to the determined fishing depth for generating a signal to the motor driving means to cyclically drive the motor in one direction until the upper fishing depth is reached and then in the other direction until the lower fishing depth is reached.

16. The system of claim 15, wherein the means for storing a selected jigging length comprises a first electronic memory into which a default jigging length value has been stored.

17. The system of claim 16, wherein the means for storing a selected jigging length comprises a second electronic memory coupled to a selecting means for setting a desired value.

18. The system of claim 17, further comprising up-/down electrical control means for providing a signal to the motor drive means which overrides the signal from said control means.

19. A system for automatically-controlled fishing machine comprising:
   a motor coupled to a drum on which is stored a length of fishing line;
   means for driving the motor and thereby rotating said drum to control the amount of fishing line extending from said drum;
   means for determining a fishing depth value from the amount of fishing line extending from said drum;
   means coupled to said depth determining means for monitoring a manually controlled fishing depth;
   means coupled to said depth determining means for monitoring a manually controlled jigging length;
   means for storing the monitored fishing depth and jigging length; and
   automatic control means for, when actuated, generating a signal to said motor driving means to automatically attain an actual fishing depth and an actual jigging length, respectively, corresponding to the stored fishing depth and the stored jigging length.

20. A method for automatically controlling a fishing machine having a motor driving a line drum with fishing line wound thereon, said method comprising the steps of:
   storing a desired value of jigging length;
   detecting the actual depth of the fishing line;
   deriving an upper fishing depth and a lower depth by combining a set fishing depth with the desired jigging length;
   comparing the actual depth with the upper and lower depths; and
   controlling the motor to jerk the fishing line between said upper and lower depths.

21. A method for automatically controlling a fishing machine having a motor driving a line drum with fishing line wound thereon, said method comprising the steps of:
   storing a desired value of line pull;
   detecting the actual line pull;
   comparing the desired line pull with the actual line pull; and
   controlling supply of power to the motor in response to such comparison to maintain the line pull at the desired value.

22. A system for automatically-controlled fishing machine comprising:
   a motor coupled to a drum on which is stored a length of fishing line;
   means for driving the motor and thereby rotating said drum to control the amount of fishing line extending from said drum;
   means for storing a selected fishing depth;
   control means for comparing the selected fishing depth and the determined fishing depth for generating a signal to the motor driving means to drive the motor until the determined fishing depth substantially equals the selected fishing depth;
   bottom finder means for detecting when the fishing line has reached bottom and, in response, to generate a brake signal to said motor driving means for stopping the motor, wherein said bottom finder means comprises load detecting means for sensing the load on the line, reference means to establish a reference load signal, and comparator means coupled to the load detecting means and the reference means to generate said brake signal when the sensed load signal drops below the level of said reference load signal.

* * * * *

UNITED STATES PATENT AND TRADEMARK OFFICE
CERTIFICATE OF CORRECTION

PATENT NO. : 4,752,878
DATED : June 21, 1988
INVENTOR(S) : SIGURDSSON et al

It is certified that error appears in the above-identified patent and that said Letters Patent is hereby corrected as shown below:

Col. 15, after line 23, insert the following:

--means for determining a fishing depth value from the amount of fishing line extending from said drum; and--

Signed and Sealed this

Second Day of January, 1990

*Attest:*

JEFFREY M. SAMUELS

*Attesting Officer*     *Acting Commissioner of Patents and Trademarks*